United States Patent
Schmidt et al.

(10) Patent No.: US 6,712,315 B2
(45) Date of Patent: Mar. 30, 2004

(54) METAL STRUCTURAL COMPONENT FOR AN AIRCRAFT, WITH RESISTANCE TO CRACK PROPAGATION

(75) Inventors: Hans-Juergen Schmidt, Buxtehude (DE); Herwig Assler, Jork (DE)

(73) Assignee: Airbus Deutschland GmbH, Hamburg (DE)

(*) Notice: Subject to any disclaimer, the term of this patent is extended or adjusted under 35 U.S.C. 154(b) by 0 days.

(21) Appl. No.: 10/150,567

(22) Filed: May 16, 2003

(65) Prior Publication Data

US 2002/0134889 A1 Sep. 26, 2002

Related U.S. Application Data

(63) Continuation-in-part of application No. 09/727,830, filed on Nov. 30, 2000, now Pat. No. 6,595,467.

(30) Foreign Application Priority Data

Dec. 22, 2001 (DE) .................................. 101 63 848

(51) Int. Cl.⁷ .................................................. B64C 1/00
(52) U.S. Cl. ................... 244/117 R; 244/123; 244/131; 244/132
(58) Field of Search ............................ 244/117 R, 123, 244/131, 132, 133, 119; 52/630, 309.1, 309.3, 309.4, 309.14, 807; 428/119

(56) References Cited

U.S. PATENT DOCUMENTS

| | | | |
|---|---|---|---|
| 2,689,698 A | | 9/1954 | Agnew |
| 2,736,521 A | * | 2/1956 | Bosserman |
| 3,201,862 A | | 8/1965 | Gotoh |
| 3,771,748 A | * | 11/1973 | Jones .......................... 244/123 |
| 3,995,081 A | | 11/1976 | Fant et al. |
| 4,079,903 A | * | 3/1978 | Ashton et al. .............. 244/123 |
| 4,811,540 A | * | 3/1989 | Kallies et al. .............. 244/123 |
| 5,476,704 A | * | 12/1995 | Kohler ....................... 244/123 |
| 5,841,098 A | | 11/1998 | Gedrat et al. |
| 5,842,317 A | | 12/1998 | Pettit |
| 5,893,534 A | | 4/1999 | Watanabe |
| 6,328,260 B1 | | 12/2001 | Tarbox et al. |
| 6,364,250 B1 | | 4/2002 | Brinck et al. |
| 6,543,721 B2 | * | 4/2003 | Palm .......................... 244/123 |

FOREIGN PATENT DOCUMENTS

| | | |
|---|---|---|
| DE | 19639667 | 3/1998 |
| DE | 19844035 | 11/1999 |
| DE | 19924909 | 6/2000 |

OTHER PUBLICATIONS

Palm; "Stressed–Skin Component Made of Metal"; USSN: 09/774,091, filed: Jan. 31, 2001, Publication No. US 2001/0038057 A1, Publication Date: Nov. 8, 2001; Title page; 3 sheets of drawings and pp. 1 to 4.

Schmidt; "Aircraft Fuselage Shell Component With Crack Propagation Resistance", USSN: 09/727,830; filed: Nov. 30, 2000, Publication No. US 2002/0000492 A1, Publication Date: Jan. 3, 2002; Title page; 3 sheets of drawings and pp. 1 to 6.

* cited by examiner

*Primary Examiner*—Galen L. Barefoot
(74) *Attorney, Agent, or Firm*—W. F. Fasse; W. G. Fasse

(57) ABSTRACT

A metallic structural component for an aircraft includes stiffening profile members integrally formed or connected onto a skin sheet. Each stiffening profile member includes a first part integrally connected to the skin sheet, and a second part non-integrally connected to the first part so as to form an internal boundary surface within the multi-part stiffening profile member. If a crack forms in the skin sheet and propagates into the first part of the stiffening profile member, the internal boundary surface resists the further propagation of the crack past this boundary surface. The crack propagation resistance is improved, the remaining strength of the structural component after formation of a crack is increased, and the overall structural component is light in weight. The outer contour of the stiffening profile member is not affected by the provision of the separate first and second parts or the internal boundary surface therebetween.

26 Claims, 1 Drawing Sheet

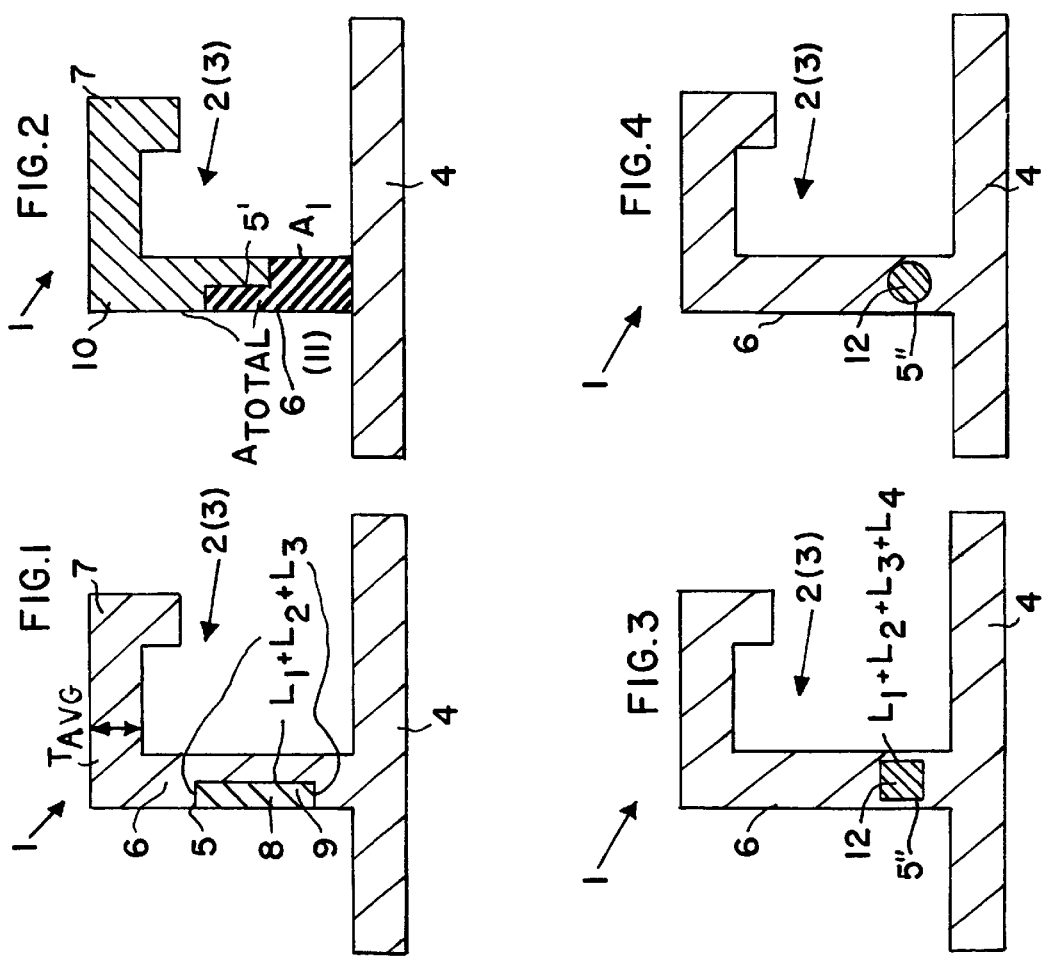

METAL STRUCTURAL COMPONENT FOR AN AIRCRAFT, WITH RESISTANCE TO CRACK PROPAGATION

CROSS-REFERENCE TO RELATED APPLICATION

This application is a Continuation-In-Part of U.S. application Ser. No. 09/727,830 filed Nov. 30, 2000, now U.S. Pat. No. 6,595,467 issued Jul. 22, 2003, the entire disclosure of which is incorporated herein by reference.

PRIORITY CLAIM

This application is based on and claims the priority under 35 U.S.C. §119 of German Patent Application 101 63 848.5, filed on Dec. 22, 2001, the entire disclosure of which is incorporated herein by reference.

FIELD OF THE INVENTION

The invention relates to a metal structural component for an aircraft, including a plurality of stiffening profile members arranged on and integrally connected with a metal skin sheet.

BACKGROUND INFORMATION

The majority of aircraft structures, such as the fuselage and the wings for example, are fabricated of metal or metallic materials. In order to satisfy primarily the stiffness and strength requirements, the prevailing conventional construction technique for fabricating such aircraft structures is to provide stiffening members on a metal skin sheet. An especially meaningful example thereof is the fuselage, of which the outer fuselage skin is reinforced or strengthened by stringers extending in the longitudinal direction and by frames extending in the circumferential direction. Typically, riveting or adhesive bonding is used as the joining method for joining the stringers and/or frames onto the skin sheets. Such a construction method is generally referred to as a differential construction method, because it involves a non-integral connection between the stiffening members and the skin sheets as separate differentiated components.

Furthermore, it is also known to fabricate integral structural components with a direct integral connection between the stiffening members and the skin. This integral construction method may, for example, involve simultaneously extruding the skin and the stiffening members as a single integral component, or the use of welding methods for integrally joining the stiffening members onto the skin in order to form a resulting integral structural component. For example, it is known to use laser beam welding for fabricating a structural component including stringers welded onto a skin, for example as disclosed in German Patent DE 196 39 667 C1 and corresponding U.S. Pat. No. 5,841,098.

Structural components of the above described type are typically used as fuselage shells in the construction of an aircraft. During the subsequent operation of the aircraft, both static as well as cyclical mechanical loads arise in the fuselage, which can lead to the formation of cracks or rips in the reinforced, i.e. strengthened, metal skin sheet. Once such a crack or rip forms in the skin sheet, it tends to propagate along the skin sheet. In consideration of such potential damage, both the requirements of the crack propagation characteristics as well as the residual or remaining strength characteristic of the structural component are taken into account during the design of the aircraft, and especially the pertinent structural components thereof. The required damage tolerance characteristic of such a structural component is dependent on how a skin crack will behave once it forms in and propagates along the skin sheet and then meets perpendicularly onto a stiffening member.

In the case of a differential construction method, in which the stiffening members are riveted or adhesively bonded onto the skin sheets, a skin crack will typically continue propagating and pass directly under the stiffening member, without propagating into the stiffening member. Thus, the stiffening member thereby remains undamaged, while bridging across and holding together the crack in the underlying skin sheet, so that as a positive effect, the further propagation of the crack is stopped or hindered. In other words, in such a differential manner of construction, the riveted or adhesively bonded stiffening members act as crack or rip stoppers or at least crack propagation retarding elements. Thereby, the further crack propagation in the fuselage shell is stopped, hindered, or retarded, because the front tip of the propagating crack will be held together, i.e. the two portions of the skin sheet on opposite sides of the crack will be held together by the riveted or adhesively bonded stiffening member, at least for a certain number of load cycles.

On the other hand, in the case of an integral manner of construction, in which the stiffening members are integrally connected with the skin sheets, a crack propagating in the skin sheet, once it reaches a stiffening member, will also propagate into the stiffening member. In other words, the crack front or tip, once it reaches the stiffening member, will be divided into a skin crack running in the skin sheet and a stiffening member crack running in the base or pedestal portion of the stiffening member. Both of these cracks will then continue to propagate in the two respective component portions independently of each other.

Such an integral stiffening member that has been damaged by a partial crack therein thus has both a reduced strength as well as a reduced stiffness in comparison to a stiffening profile member that has been connected to the skin in a differential non-integral manner. As a result of the cracking and thus weakening of the integral stiffening member, it no longer provides an effective holding-together of the skin sheet portions on opposite sides of the crack, so that the further propagation of the crack is not adequately prevented or retarded. This cracking process leads to a reduced residual or remaining strength of the structural component after a crack has been formed therein, and to an overall disadvantageous crack propagation characteristic. In critical areas of the fuselage shell in which the residual or remaining strength is determinative as a design criterium, the fuselage shells must be thickened to provide greater strength and stiffness, and especially an adequate residual or remaining strength even after the crack has propagated therein. This in turn leads to an unacceptable weight increase, especially in the side and overhead shell areas of the fuselage.

German Patent DE 199 24 909 C1 discloses an approach to solving or addressing the above described problem in an integral structural component. Particularly, this reference discloses a thickening in the base or pedestal portion of the stiffening member of the structural component, for retarding or deflecting the further propagation of a crack. However, since the thickening of the pedestal portion of the stiffening member is integral with the stiffening member, i.e. the thickening is an integral common portion (i.e. integrally joined on the atomic level) of the stiffening member, there basically still exists a danger that a crack can propagate unchecked through the entire cross-section of the thickening member. Moreover, the external shape of such a stiffening member differs from the previously conventional stiffening member shapes, due to the extra protruding thickened area of the pedestal portion. Therefore, tools, jigs and other devices used during the fabrication of an aircraft fuselage must in many cases be altered or adapted to the changed configuration of the stiffening members, which leads to additional tooling and set-up costs.

SUMMARY OF THE INVENTION

In view of the above, it is an object of the present invention to provide a metallic structural component including stiffening members integrally connected with a skin sheet, wherein a large surface propagation of a crack is prevented or hindered, and therewith an improved crack propagation characteristic and an increased residual strength after formation of a crack are achieved. Further objects of the invention are to provide such a structural component that meets the requirements of a lightweight structure as needed in the field of aircraft construction, and to provide a stiffening profile member that has an improved crack propagation resistance yet has an external cross-sectional shape that is essentially the same as any desired conventional stiffening profile member without the special inventive features. The invention further aims to avoid or overcome the disadvantages of the prior art, and to achieve additional advantages, as apparent from the present specification.

The above objects have been achieved according to the invention in a metallic structural component for an aircraft including a metal skin sheet and a plurality of stiffening profile members integrally connected onto the skin sheet, wherein each stiffening profile member comprises a first part that is integrally connected to the skin sheet and a second part that is non-integral with the first part, so as to form an internal boundary surface between the first part and the second part. The internal boundary surface acts to prevent or hinder a further crack propagation across this internal boundary surface. The overall cross-sectional shape of the stiffening profile member is made up of the two parts thereof, whereby this overall cross-sectional profile shape may have essentially the same shape as any conventionally known stiffening profile member. In other words, the provision of the separate first and second parts of the stiffening profile member does not significantly influence or change the overall cross-sectional profile shape of the stiffening profile member.

With the inventive structure of the stiffening profile member, it is especially advantageous that the post-crack residual strength of a metallic structural component having an integral construction is increased, so that such a structural component is suitable for use as a fuselage shell of an aircraft even in areas that are primarily loaded under tension and that are therefore critical in view of the fatigue characteristics of the component. Thus, it now becomes possible to use welded or otherwise integral fuselage shells for the entire fuselage of the aircraft, which advantageously reduces the effort and expense of the construction of the aircraft, due to the advantages in the fabrication. Moreover, the crack stopping or retarding measures are incorporated within the usual previously-existing cross-sectional profile shape of the stiffening profile member, and do not have a substantial effect on the stiffening member geometry (for example not requiring an external thickening or reinforcement of the previously existing stiffening members). It is thus possible to continue to use all of the previously existing manufacturing equipment and methods, without any special changes.

The inventive structure eliminates or substantially overcomes the disadvantages of the crack propagation characteristic of welded shell components, i.e. integral shell components. In the event of the occurrence of a primary crack in the fuselage skin, the simultaneously formed crack in the stiffening profile member will be stopped, deflected, or adequately hindered or retarded from further propagation in the stiffening profile member upon reaching the internally incorporated boundary surfaces between the first part and the second part of the respective stiffening profile member.

BRIEF DESCRIPTION OF THE DRAWINGS

In order that the invention may be clearly understood, it will now be described in connection with example embodiments thereof, with reference to the accompanying drawings, wherein:

FIG. 1 is a cross-sectional view of an integral structural component in the area of a stringer integrally connected with a skin sheet, with a first embodiment of the inventive measures for crack propagation resistance incorporated in the stringer;

FIG. 2 is a cross-sectional view similar to that of FIG. 1, but showing a second example embodiment;

FIG. 3 is a cross-sectional view similar to that of FIG. 1, but showing a third example embodiment; and FIG. 4 is a cross-sectional view similar to that of FIG. 1, but showing a fourth example embodiment.

DETAILED DESCRIPTION OF PREFERRED EXAMPLE EMBODIMENTS AND OF THE BEST MODE OF THE INVENTION

The drawing figures each respectively show a cross-sectional view of a portion of a metallic structural component 1 in the area of a stiffening profile member 2 integrally connected onto a metallic skin sheet 4. In this particular example, the structural component 1 is embodied an aircraft fuselage structural shell, and the stiffening profile member 2 is embodied as a stringer 3 running in the aircraft longitudinal direction. The stiffening profile member 2, i.e. the stringer 3, is welded onto or otherwise integrally connected onto the skin sheet 4, with a direct integral connection therebetween. A further example, other than welding, for achieving such an integral structure with an integral connection between the stiffening profile members 2, i.e. stringers 3, and the skin sheet 4, is the simultaneous extrusion of the skin sheet 4 with the stiffening profile members 2, 3 thereon.

While the drawings merely show a small portion of the structural component 1, it should be understood that such a structural component 1 for use as a fuselage shell of an aircraft includes a plurality of such stringers 3 spaced apart from one another and arranged on and extending in the aircraft longitudinal direction on the large surfacial fuselage skin 4.

FIG. 1 shows a cross-section of a first embodiment of the invention in connection with an integral structural component 1 in the area of a stringer 3 integrally arranged on the skin sheet 4. This stringer 3 includes a first embodiment of the inventive measures for crack propagation resistance, i.e. crack propagation prevention, stopping, deflection, hindering, or retarding. This is achieved by providing an internal boundary surface 5 made up of boundary surface portions having boundary surface lengths $L_1$, $L_2$ and $L_3$ internally within the stringer 3, i.e. stiffening profile member 2. If a crack propagates from the skin sheet 4 into the stiffening profile member 2, 3, once the crack reaches this boundary surface 5, the further propagation of the crack will be resisted, i.e. stopped, hindered, retarded, or deflected, because the crack will not be prone to "jump across" the non-integral boundary provided by the internal boundary surface 5. In other words, there is no integral force transmission across this boundary surface 5, so the crack will be less likely to propagate across this boundary. Thus, the portion of the stiffening profile member 2, 3 behind the boundary surface 5 (i.e. above the boundary surface 5 in the view of FIG. 1) will remain undamaged.

The above described boundary surface 5 is formed by providing a first part and a second part to make up the overall stiffening profile member 2, 3. In the present first embodiment of FIG. 1, the first part of the stiffening profile member 2, 3 includes a stringer web 6 and a stringer head or flange 7 that is integrally formed or connected with the stringer web 6. The stringer web 6 is integrally connected with the skin sheet 4 along a base or pedestal edge of the stringer web 6. The second part comprises a partial component 8, here embodied as a narrow rectangular sectional profile member, e.g. having an |-profile. This partial component or |-profile member 8 is let into a correspondingly shaped recess 9 in the side of the stringer web 6. Various joining methods can be used for joining the partial component or |-profile member 8 into the stringer web 6, for example by means of adhesive bonding, soldering, press-fitting, or the like.

In any event, with such a construction, the boundary surface 5 includes three partial boundary surfaces along the three sides of the |-profile member 8 interfacing with the three sides of the recess 9 in the side of the stringer web 6, respectively having the boundary surface lengths $L_1$, $L_2$ and $L_3$. The portion of the stiffening profile member 2, 3 that is protected against the further propagation of a crack in this embodiment is thus especially the portion of the stringer web 6 above the boundary surface 5, as well as the stringer head flange 7. These portions of the stiffening profile member 2 will remain undamaged by a crack, even if the crack propagates into the lower portion of the stringer web 6 below the boundary surface 5, because the crack will not propagate past the boundary surface 5.

As mentioned above, the |-profile member 8 inserted in the recess 9 forms three partial boundary surfaces with boundary surface lengths $L_1$, $L_2$ and $L_3$. The sum of these boundary surface lengths $L_1$, $L_2$, $L_3$ is preferably greater than or equal to the average thickness of the overall stiffening profile member 2 (i.e. $\Sigma L_i \geq T_{avg}$), in order to achieve an especially effective resistance against further crack propagation. More particularly, the effectiveness of this embodiment for increasing the residual strength of the structural component 1 after the formation of a crack therein is especially improved when the sum of the boundary surface lengths $L_1$, $L_2$, $L_3$ ... $L_i$ is greater than or equal to the average thickness of the stiffening profile member 2, 3 (i.e. $\Sigma L_i \geq T_{avg}$)

As alternatives to this illustrated embodiment in which the partial component 8 has an elongated flat rectangular cross-sectional shape, other geometrical cross-sectional shapes of the partial components (i.e. second parts) to be inserted into the stringer webs are also possible, for example a round or circular cross-sectional shape, or a polygon shape such as a trapezoidal sectional shape.

Moreover, the selection of the material for the partial component such as the |-profile member 8 is independent of the material of the other part of the stiffening profile member 2, 3. In other words, the first part including the stringer web 6 and the stringer flange 7 may consist of a different material than the second part comprising the partial component 8.

Also, since the partial component 8 does not need to be integrally welded or extruded together with the first part, therefore the material selected for the second part does not need to be limited to weldable or extrudable materials.

The positions and orientations of the partial boundary surfaces of the boundary surface 5 are to be selected so that a crack propagating perpendicularly to the load application direction (which corresponds to the stiffening direction, i.e. the stringer web direction), meets upon the boundary surface 5 essentially at a right angle. Throughout this specification, terms such as "substantially" perpendicularly or "essentially" at a right angle, mean within ±10° of a right angle. The position, orientation, dimensions, configuration, joint technique, and the like of the boundary surface 5 are particularly designed so that the energy release rate for a 90° deflection of a crack upon reaching the boundary surface 5 is greater than the energy release rate for the further propagation and entry of a crack into the portion of the stiffening profile member 2, 3 lying beyond or behind the boundary surface 5. Thereby, a 90° deflection of the crack is preferred or more likely to occur than a further propagation of the crack beyond the boundary surface 5, in view of the energy considerations.

FIG. 2 shows a cross-section through a second embodiment of an inventive structural component 1 in the area of a stringer 3 integrally arranged and connected on a skin sheet 4. An internal boundary surface 5' has been incorporated into the stiffening profile member 2, 3 of this integral structural component 1, in that the stiffening profile member 2, 3 is made up of a first part comprising a web base or pedestal 11 that is integrally connected with the skin sheet 4, as well as a second part comprising a separate partial component 10 that includes a second portion of the stringer web 6 and a stringer head or flange 7 provided thereon. The stringer web pedestal 11 forms a first portion of the stringer web 6. The two separate parts, i.e. the partial component 10 and the stringer web pedestal 11, are connected to each other in a non-integral manner, using any conventionally known differential joining technique, such as adhesive bonding, soldering, compression-joining, etc., whereby the internal boundary surface 5' is formed therebetween.

The shape and size of each of the two parts of the stiffening profile member 2, 3 is such that the overall shape or geometry of the stiffening profile member 2, 3 is not substantially changed. In other words, the external dimensions and shape thereof can correspond to any conventional shape of such a stiffening profile member 2, 3, and particularly an additional enlarging and corresponding weight increase of the component is avoided. In all of the embodiments of the present invention, it can be seen that the stringer web of the stringer or stiffening profile member 2, 3 has flat planar uninterrupted outer surfaces, which are not enlarged, distended, or changed in shape by the provision of the inserted second part. Thus, it is important that the second part and the resulting boundary surface are incorporated entirely within the usual uninterrupted flat planar outer surface shape of the stiffening profile member 2, 3. Overall, the exemplary stringers each have generally an inverted L-shape or inverted J-shape.

In this second embodiment of FIG. 2, the size or particularly the remaining cross-sectional area Al of the stringer web pedestal 11 that is integrally joined onto the skin sheet 4 is preferably smaller than one half of the total or overall cross-sectional area of the stiffening profile member 2 in order to achieve a most effective increase of the residual strength. This can be expressed by the following relationship: $A_1 < A_{TOTAL}/2$.

Regarding the position, orientation and dimensions of the boundary surface 5', reference is made to the corresponding description relating to the above first embodiment, which is also pertinent here, with respect to the horizontal and vertical arrangement of the boundary surface 5', or the partial surfaces thereof, formed by the stepped scarf or rabbet joint between the partial component 10 and the web pedestal 11. Particularly, this joint is so configured and arranged so that a crack propagating perpendicularly to the load direction (i.e. corresponding to the stiffening direction) meets upon the boundary surface 5' substantially at a right angle. As mentioned above, this joint can be secured by any differential joining method, such as adhesive bonding, soldering, compression-joining, etc.

In this second embodiment of the structural component 1, or particularly this stiffening profile member 2, 3, it is possible to fabricate the partial component 10 of a different material or particularly a different material composite (e.g. organic, metallic and/or ceramic in nature), relative to the material of the web pedestal 11. It should especially be noted that composite materials can be used, as well as monolithic materials. In this manner, even materials that are not extrudable or not weldable can be utilized, without having to give up the general advantages achieved by the integral construction. In other words, the web pedestal 11 will still be integrally formed or connected with the skin sheet 4, which leads to a faster and more economical fabrication, and also makes it possible to realize a weight reduction. These advantages can still be achieved even though the partial component 10 is non-integrally joined onto the web pedestal 11.

FIG. 3 shows a cross-section through a further third embodiment of an inventive structural component 1 in the area of a stiffening profile member or stringer 2, 3 integrally connected with a skin sheet 4. An internal boundary surface 5" is formed within 20 the integral structural component 1, by incorporating a second separate component 12 within a stringer web 6 of the overall stiffening profile member 2. In this embodiment, the geometric form of this component 12 is preferably rectangular or quadratic, and particularly square as shown in FIG. 3. However, it is possible to alternatively provide such a second component 12 with a different cross-sectional shape, such as a round circular cross-sectional shape as shown in FIG. 4, or a polygon shape.

Just as described in connection with the first embodiment above, it also pertains here that the sum of all of the boundary surface lengths $L_1$, $L_2$, $L_3$ and $L_4$ is preferably greater than or equal to the average thickness of the stiffening profile member 2 (i.e. $\Sigma L_i > T_{avg}$) The position and orientation of the boundary surface 5" is selected so that a crack propagating perpendicularly to the load direction (i.e. the load direction corresponds to the stiffening direction), will meet upon the boundary surface substantially at a right angle.

The material for the second component 12 inserted or incorporated into the stiffening profile member 2 for forming an internal boundary surface 5" can be selected independently of the material used for the other first part, e.g. the stringer web 6, of the stiffening profile member 2. Thus, the separate second component 12 can consist of other materials or material composites (e.g. of organic, metallic and/or ceramic type), in comparison to the material of the remainder of the stiffening profile member. As a particular example, the second component 12 can comprise a steel wire or stranded steel cable.

Such a stiffening profile member 2 having a second separate component 12 incorporated therein for the purpose of crack propagation resistance can be fabricated, for example, by incorporating the second component 12 into the stiffening profile member while the stiffening profile member is being extrusion-formed. If the skin sheet 4 and the stiffening profile member 2 are not being simultaneously extruded, the stiffening profile member 2 having the second component 12 therein can thereafter be welded onto the skin sheet 4 in any conventionally known manner. A further possibility is to extrude the overall stiffening profile member 2 as a hollow sectional profile member, and then to introduce the second component 12 therein, for example joining it into position in the correspondingly provided hollow space by means of adhesive bonding, soldering, compression-joining, or the like. In this embodiment, as in the others, the outer surfaces of the stiffening profile member 2, 3 are smooth, flush, planar, uninterrupted surfaces, that are not effected by the internal provision of the second component.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A structural component for an aircraft, comprising:
   a skin sheet; and
   a plurality of stiffening profile members integrally connected with and protruding from said skin sheet;
   wherein a respective one of said stiffening profile members comprises a first part that is integrally connected with said skin sheet and a second p art that is discrete and non-integral with respect to said first part and that is non-integrally joined to said first part so as to form therebetween a non-integral internal boundary surface within said respective stiffening profile member;
   wherein said internal boundary surface has a property of resisting further propagation of a crack in said respective stiffening profile member; and
   wherein said first part and said second part together form an overall cross-sectional configuration of said respective stiffening profile member.

2. The structural component according to claim 1, wherein said overall cross-sectional configuration of said respective stiffening profile member does not exhibit a local cross-sectional thickening at an area of said internal boundary surface.

3. The structural component according to claim 1, wherein said second part is non-integrally joined to said first part at said internal boundary surface by at least one of adhesive bonding, soldering, press-fitting and compression-joining.

4. The structural component according to claim 1, wherein said overall cross-sectional configuration of said respective stiffening profile member is not affected by the provision of said first part and said second part as respective separate parts joined to each other at said internal boundary surface.

5. The structural component according to claim 1, wherein said overall cross-sectional configuration includes a profile member web section, which has said internal boundary surface formed therein, and which has two opposite side surfaces that have said internal boundary surface therebetween and that are flat, planar, continuous and uninterrupted.

6. The structural component according to claim 5, wherein at least one of said side surfaces includes a first surface portion of said first part and a second surface portion of said second part, and wherein said first surface portion and said second surface portion are flush and coplanar with one another.

7. The structural component according to claim 5, wherein said side surfaces are entirely formed by respective surfaces of said first part, and wherein said second part is arranged and received entirely internally within said first part.

8. The structural component according to claim 1, wherein said first part comprises a profile member web that is integrally connected with and protrudes from said skin sheet, said profile member web has a rectangular recess in a side surface thereof, said second part comprises a rectangular sectional member with a cross-sectional shape matching that of said rectangular recess, and said rectangular sectional member is fitted into said rectangular recess.

9. The structural component according to claim 8, wherein said rectangular sectional member is an |-profile member, with the longer cross-sectional axis of said |-profile member extending parallel to the longer cross-sectional axis of said profile member web.

10. The structural component according to claim 1, wherein said first part comprises a profile member web with an internal channel therein, and said second part comprises a sectional member that is arranged in said internal channel entirely within said profile member web.

11. The structural component according to claim 10, wherein said sectional member is a square sectional member.

12. The structural component according to claim 1, wherein said second part comprises a round sectional member.

13. The structural component according to claim 1, wherein said second part comprises a steel cable arranged internally within and extending longitudinally along said first part.

14. The structural component according to claim 1, wherein said first part comprises a web pedestal that is integrally connected with and protrudes from said skin sheet, and said second part comprises a distal profile member portion that is joined to said web pedestal at said internal boundary surface and protrudes therefrom away from said skin sheet.

15. The structural component according to claim 14, wherein said distal profile member portion includes a distal profile member web portion extending continuously from said web pedestal and a profile member flange extending perpendicularly relative to said distal profile member web portion, and wherein said web pedestal and said distal profile member portion together form said overall cross-sectional configuration having an inverted L or inverted J sectional profile.

16. The structural component according to claim 14, wherein said internal boundary surface is a stepped internal boundary surface along a rabbet or scarf joint between said web pedestal and said distal profile member web portion.

17. The structural component according to claim 14, wherein a cross-sectional area of said web pedestal is less than one-half of a total cross-sectional area of said overall cross-sectional configuration of said respective stiffening profile member.

18. The structural component according to claim 1, wherein a total cross-sectional length of said internal boundary surface is greater than or equal to an average thickness of said stiffening profile member.

19. The structural component according to claim 1, wherein said internal boundary surface is so configured, oriented and arranged, that a crack propagating in said structural component perpendicularly to the loading direction will meet substantially perpendicularly upon said internal boundary surface.

20. The structural component according to claim 1, wherein said internal boundary surface is so configured, oriented and arranged, that a 90° deflection of a crack propagating to said internal boundary surface will cause a greater energy release rate than a further crack propagation of said crack past and beyond said internal boundary surface.

21. The structural component according to claim 1, wherein said first part consists of a first material, and said second part consists of a second material different from said first material.

22. The structural component according to claim 21, wherein said second material comprises a composite of at least one of organic, metallic and ceramic constituents.

23. The structural component according to claim 1, wherein said skin sheet consists of a first metal material, said first part consists of a second metal material which may be the same as or different from said first metal material, and said second part consists of a non-metal material.

24. The structural component according to claim 23, wherein said non-metal material comprises a composite.

25. A structural component for an aircraft, comprising:
   a skin sheet; and
   a plurality of stiffening profile members integrally connected with and protruding from said skin sheet;
   wherein a respective one of said stiffening profile members comprises a first part that is integrally connected with said skin sheet and a second part that is joined to said first part so as to form therebetween an internal boundary surface within said respective stiffening profile member;
   wherein said internal boundary surface has a property of resisting further propagation of a crack in said respective stiffening profile member;
   wherein said first part and said second part together form an overall cross-sectional configuration of said respective stiffening profile member; and
   wherein said first part comprises a profile member web that is integrally connected with and protrudes from said skin sheet, said profile member web has a rectangular recess in a side surface thereof, said second part comprises a rectangular sectional member with a cross-sectional shape matching that of said rectangular recess, and said rectangular sectional member is fitted into said rectangular recess.

26. A structural component for an aircraft, comprising:
   a skin sheet; and
   a plurality of stiffening profile members integrally connected with and protruding from said skin sheet;
   wherein a respective one of said stiffening profile members comprises a first part that is integrally connected with said skin sheet and a second part that is joined to said first part so as to form therebetween an internal boundary surface within said respective stiffening profile member;
   wherein said internal boundary surface has a property of resisting further propagation of a crack in said respective stiffening profile member;
   wherein said first part and said second part together form an overall cross-sectional configuration of said respective stiffening profile member; and
   wherein said first part comprises a profile member web with an internal channel therein, and said second part comprises a sectional member or a steel cable that is arranged in said internal channel entirely within and extending longitudinally along said profile member web.

* * * * *

UNITED STATES PATENT AND TRADEMARK OFFICE
CERTIFICATE OF CORRECTION

PATENT NO. : 6,712,315 B2
DATED : March 30, 2004
INVENTOR(S) : Schmidt et al.

It is certified that error appears in the above-identified patent and that said Letters Patent is hereby corrected as shown below:

Title page,
Item [22], Filed, after "May 16,", replace "2003" by -- 2002 --;

Column 5,
Line 45, before "≥", replace "$L_I$" by -- $L_i$ --;
Line 51, before "is", replace "$L_1$" by -- $L_i$ --;

Column 6,
Line 61, after "area", replace "A1" by -- $A_1$ --;

Column 7,
Line 35, after "within", delete -- 20 --;
Line 49, after "$L_i$", replace ">" by -- ≥ --;

Column 8,
Line 32, after "second", replace "p art" by -- part --.

Signed and Sealed this

Twenty-ninth Day of June, 2004

JON W. DUDAS
*Acting Director of the United States Patent and Trademark Office*